(12) United States Patent
Guzzon et al.

(10) Patent No.: US 11,624,942 B2
(45) Date of Patent: *Apr. 11, 2023

(54) OPTO-ELECTRONIC MODULATOR UTILIZING ONE OR MORE HEATING ELEMENTS

(71) Applicant: OpenLight Photonics, Inc., Goleta, CA (US)

(72) Inventors: Robert Silvio Guzzon, Santa Barbara, CA (US); Erik Norberg, Santa Barbara, CA (US); Jonathan Edgar Roth, San Francisco, CA (US)

(73) Assignee: OpenLight Photonics, Inc., Goleta, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/349,389

(22) Filed: Jun. 16, 2021

(65) Prior Publication Data

US 2021/0311334 A1 Oct. 7, 2021

Related U.S. Application Data

(63) Continuation of application No. 16/745,594, filed on Jan. 17, 2020, now Pat. No. 11,067,839, which is a
(Continued)

(51) Int. Cl.
*G02F 1/00* (2006.01)
*G02F 1/01* (2006.01)
(Continued)

(52) U.S. Cl.
CPC ............ *G02F 1/025* (2013.01); *G02F 1/0063* (2013.01); *G02F 1/011* (2013.01); *G02F 1/0147* (2013.01); *G02F 1/0155* (2021.01); *G02F 1/212* (2021.01)

(58) Field of Classification Search
CPC ...... G02F 1/0063; G02F 1/011; G02F 1/0147; G02F 1/0155; G02F 1/025; G02F 1/212
See application file for complete search history.

(56) References Cited

U.S. PATENT DOCUMENTS 6,181,456 B1 * 1/2001 McBrien ............... G02F 1/0123
385/2
6,233,378 B1 5/2001 Sun
(Continued)

OTHER PUBLICATIONS

"U.S. Appl. No. 14/612,316, Final Office Action dated Mar. 1, 2016", 12 pgs.
(Continued)

*Primary Examiner* — Ryan A Lepisto
(74) *Attorney, Agent, or Firm* — Schwegman Lundberg & Woessner, P.A.

(57) ABSTRACT

Described herein are methods, systems, and apparatuses to utilize an electro-optic modulator including one or more heating elements. The modulator can utilize one or more heating elements to control an absorption or phase shift of the modulated optical signal. At least the active region of the modulator and the one or more heating elements of the modulator are included in a thermal isolation region comprising a low thermal conductivity to thermally isolate the active region and the one or more heating elements from a substrate of the PIC.

20 Claims, 8 Drawing Sheets

US 11,624,942 B2
Page 2

Related U.S. Application Data continuation of application No. 16/177,831, filed on Nov. 1, 2018, now Pat. No. 10,571,723, which is a continuation of application No. 15/363,046, filed on Nov. 29, 2016, now Pat. No. 10,151,940, which is a continuation of application No. 14/612,316, filed on Feb. 3, 2015, now Pat. No. 9,513,497.

(60) Provisional application No. 61/936,192, filed on Feb. 5, 2014.

(51) Int. Cl.
  G02F 1/025 (2006.01)
  G02F 1/015 (2006.01)
  G02F 1/21 (2006.01)

(56) References Cited

U.S. PATENT DOCUMENTS

| | | | |
|---|---|---|---|
| 7,061,950 B2* | 6/2006 | Hongo | G02F 1/0123 |
| | | | 372/38.07 |
| 9,513,497 B2 | 12/2016 | Guzzon et al. | |
| 10,151,940 B2 | 12/2018 | Guzzon et al. | |
| 10,571,723 B2 | 2/2020 | Guzzon et al. | |
| 11,067,839 B2* | 7/2021 | Guzzon | G02F 1/011 |
| 2002/0039470 A1 | 4/2002 | Braun et al. | |
| 2003/0086465 A1 | 5/2003 | Peters et al. | |
| 2003/0086655 A1 | 5/2003 | Deacon | |
| 2003/0095736 A1 | 5/2003 | Fred, Jr. et al. | |
| 2003/0095737 A1 | 5/2003 | Welch et al. | |
| 2003/0099018 A1 | 5/2003 | Singh et al. | |
| 2009/0110342 A1 | 4/2009 | Webster et al. | |
| 2009/0245296 A1 | 10/2009 | Santori et al. | |
| 2013/0336613 A1 | 12/2013 | Meade et al. | |
| 2015/0219935 A1 | 8/2015 | Guzzon et al. | |
| 2017/0075149 A1 | 3/2017 | Guzzon et al. | |
| 2019/0072787 A1 | 3/2019 | Guzzon et al. | |
| 2020/0150466 A1 | 5/2020 | Guzzon et al. | |

OTHER PUBLICATIONS

"U.S. Appl. No. 14/612,316, Non Office Action dated Nov. 16, 2015", 8 pgs.
"U.S. Appl. No. 14/612,316, Notice of Allowance dated Sep. 14, 2016", 7 pgs.
"U.S. Appl. No. 14/612,316, Response filed Feb. 9, 2016 to Non Final Office Action dated Nov. 16, 2015", 10 pgs.
"U.S. Appl. No. 14/612,316, Response filed Sep. 1, 2016 to Final Office Action dated Mar. 1, 2016", 10 pgs.
"U.S. Appl. No. 15/363,046, Response filed Jan. 16, 2018 to Final Office Action dated Nov. 17, 2017", 18 pgs.
"U.S. Appl. No. 15/363,046, Advisory Action dated Mar. 13, 2018", 3 pgs.
"U.S. Appl. No. 15/363,046, Final Office Action dated Nov. 17, 2017", 14 pgs.
"U.S. Appl. No. 15/363,046, Non Final Office Action dated Apr. 20, 2018", 9 pgs.
"U.S. Appl. No. 15/363,046, Non Final Office Action dated Sep. 7, 2017", 10 pgs.
"U.S. Appl. No. 15/363,046, Notice of Allowance dated Aug. 13, 2018", 8 pgs.
"U.S. Appl. No. 15/363,046, Preliminary Amendment filed Dec. 19, 2016", 7 pgs.
"U.S. Appl. No. 15/363,046, Response filed Jul. 20, 2018 to Non Final Office Action dated Apr. 20, 2018", 14 pgs.
"U.S. Appl. No. 15/363,046, Response filed Aug. 25, 2017 to Restriction Requirement dated Jul. 14, 2017", 8 pgs.
"U.S. Appl. No. 15/363,046, Response filed Oct. 31, 2017 to Non Final Office Action dated Sep. 7, 2017", 14 pgs.
"U.S. Appl. No. 15/363,046, Restriction Requirement dated Jul. 14, 2017", 6 pgs.
"U.S. Appl. No. 16/177,831, Final Office Action dated Aug. 27, 2019", 11 pgs.
"U.S. Appl. No. 16/177,831, Non Final Office Action dated May 17, 2019", 10 pgs.
"U.S. Appl. No. 16/177,831, Notice of Allowance dated Nov. 8, 2019", 7 pgs.
"U.S. Appl. No. 16/177,831, Response filed Oct. 28, 2019 toFinal Office Action dated Aug. 27, 2019".
"U.S. Appl. No. 16/177,831, Response filed Aug. 19, 2019 to Non-Final Office Action dated May 17, 2019", 14 pgs.
"U.S. Appl. No. 16/745,594, Corrected Notice of Allowability dated Jun. 10, 2021", 2 pgs.
"U.S. Appl. No. 16/745,594, Non Final Office Action dated Dec. 22, 2020", 9 pgs.
"U.S. Appl. No. 16/745,594, Notice of Allowance dated Apr. 7, 2021", 9 pgs.
"U.S. Appl. No. 16/745,594, Response filed Mar. 22, 2021 to Non Final Office Action dated Dec. 22, 2020", 8 pgs.
"U.S. Appl. No. 16/745,594, Response filed Dec. 8, 2020 to Restriction Requirement dated Oct. 29, 2020", 6 pgs.
"U.S. Appl. No. 16/745,594, Restriction Requirement dated Oct. 29, 2020", 7 pgs.
"European Application Serial No. 15000326.7, Communication Pursuant to Article 94(3) EPC Apr. 16, 2019", 6 pgs.
"European Application Serial No. 15000326.7, Communication Pursuant to Article 94(3) EPC dated Mar. 19, 2021", 4 pgs.
"European Application Serial No. 15000326.7, Extended European Search Report dated Jun. 25, 2015", 8 pgs.
"European Application Serial No. 15000326.7, Response filed Aug. 9, 2019 to Communication Pursuant to Article 94(3) EPC dated Apr. 16, 2019", 12 pgs.
Cho, et al., "Interferometric microring-resonant 2x2 optical switches", Optics Express, vol. 16, No. 17, (Aug. 18, 2008), 13304-13314.
Coldren, Larry A, et al., "High Performance InP-Based Photonic ICs-A Tutorial", Journal of Lightwave Technology 29, 4, (2011), 554-570.
Oliveira, et al., "Similarities between birefringent Gires-Tournois interferometer and double ring assisted MachZehnder electrooptic modulator", Proceedings of the 37th European Microwave Conference, Munich Germany, (Oct. 1, 2007), 1330-1333.
U.S. Appl. No. 14/612,316, U.S. Pat. No. 9,513,497, filed Feb. 3, 2015, Opto-Electronic Modulator Utilizing One or More Heating Elements.
U.S. Appl. No. 15/363,046, U.S. Pat. No. 10,151,940, filed Nov. 29, 2016, Opto-Electronic Modulator Utilizing One or More Heating Elements.
U.S. Appl. No. 16/177,831, U.S. Pat. No. 10,571,723, filed Nov. 1, 2018, Opto-Electronic Modulator Utilizing One or More Heating Elements.
U.S. Appl. No. 16/745,594, filed Jan. 17, 2020, Opto-Electronic Modulator Utilizing One or More Heating Elements.
"European Application Serial No. 15000326.7, Response filed Jul. 27, 2021 to Communication Pursuant to Article 94(3) EPC dated Mar. 19, 2021", w/ Claims, 9 pgs.

* cited by examiner

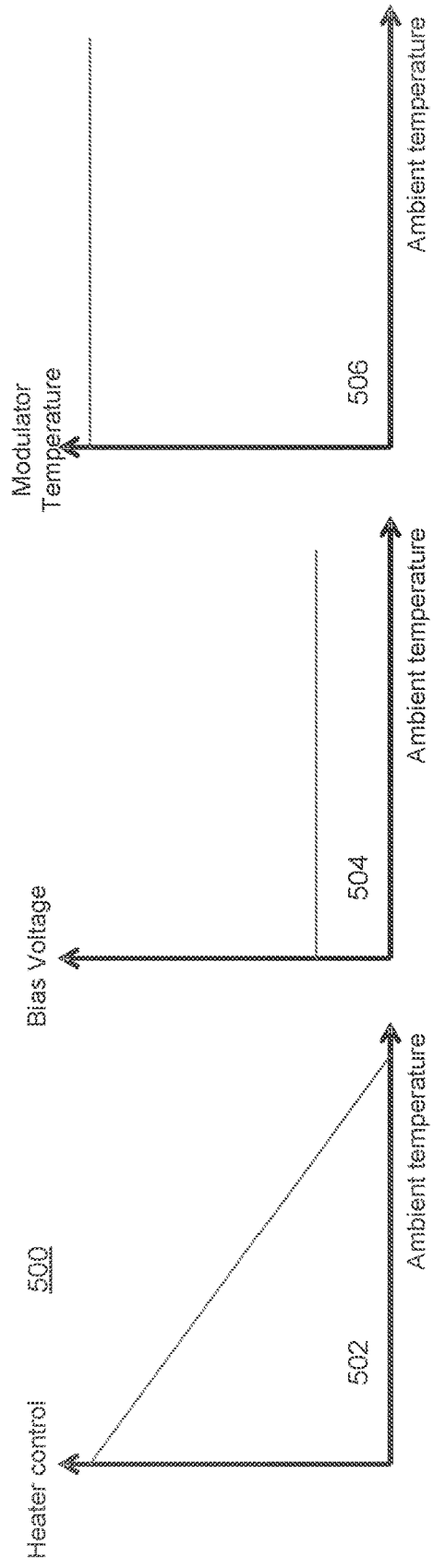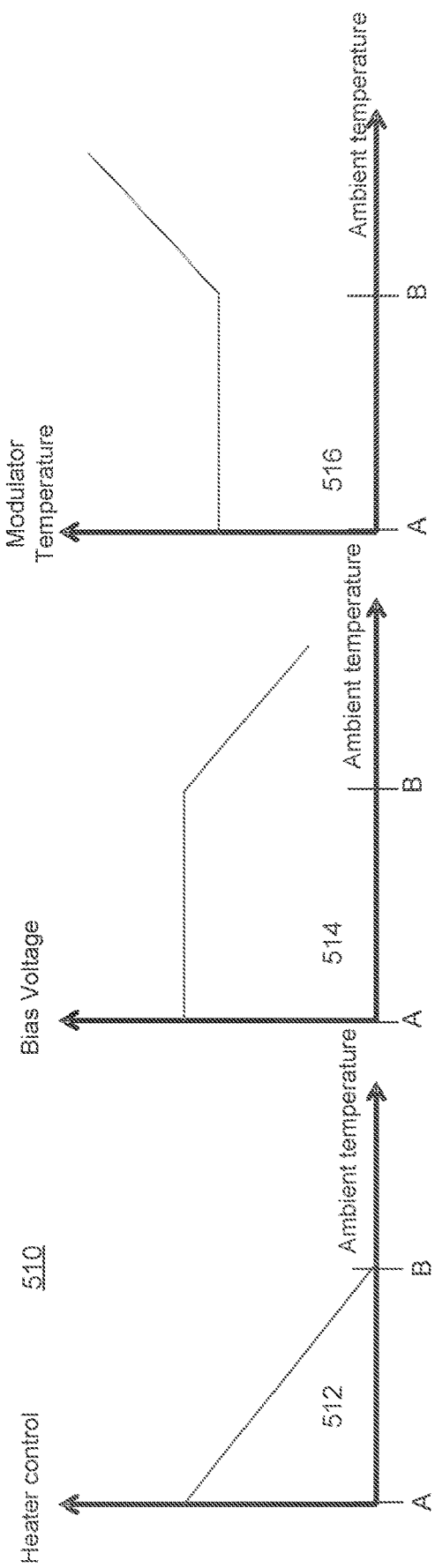
FIG. 5A
FIG. 5B

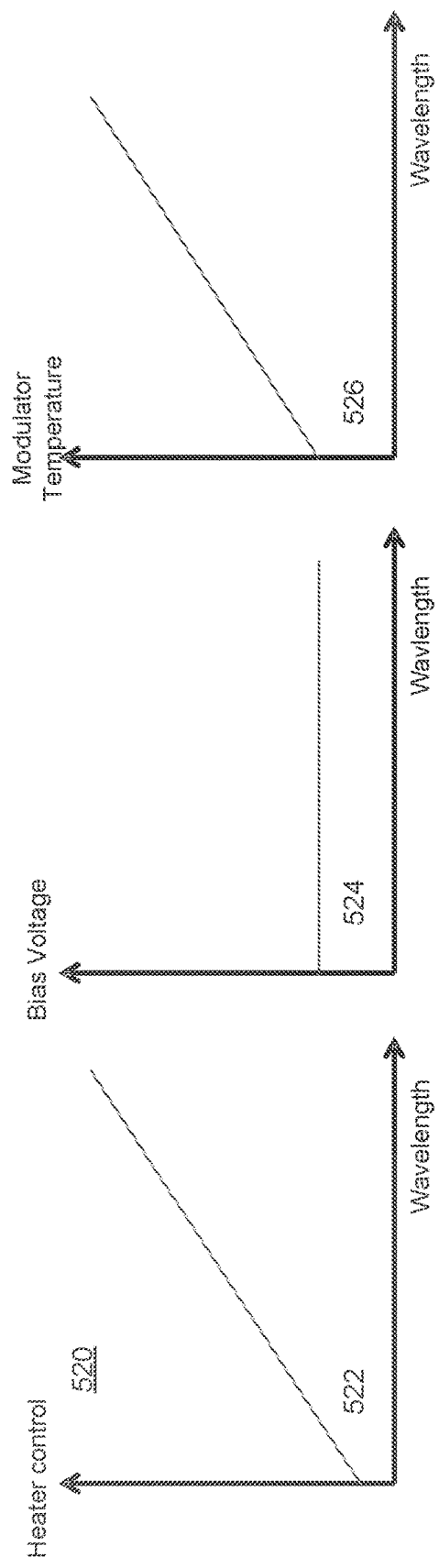
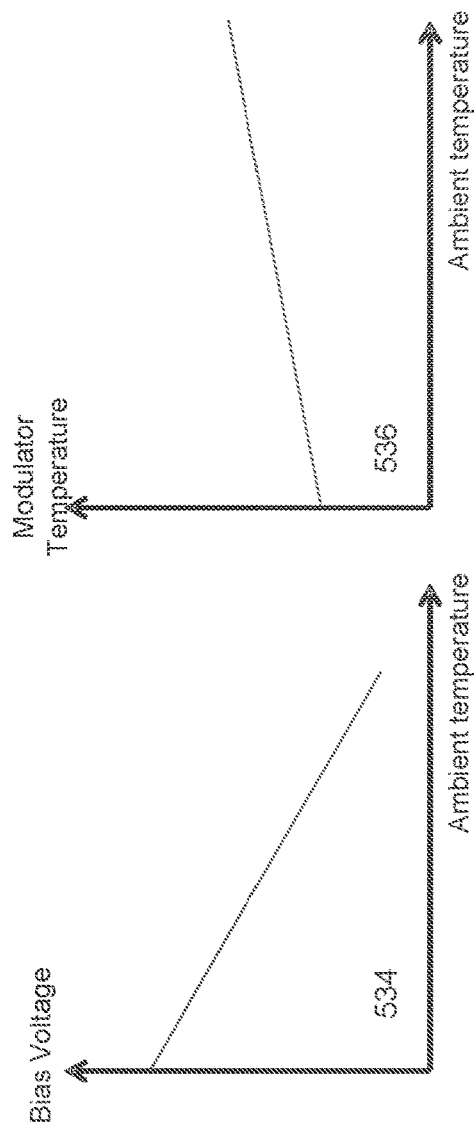
FIG. 5C
FIG. 5D

OPTO-ELECTRONIC MODULATOR UTILIZING ONE OR MORE HEATING ELEMENTS

CROSS-REFERENCE TO RELATED APPLICATIONS

This application is a continuation of U.S. application Ser. No. 16/745,594, filed Jan. 17, 2020, which is a continuation of U.S. application Ser. No. 16/177,831, filed Nov. 1, 2018, which is a continuation of U.S. application Ser. No. 15/363,046, filed Nov. 29, 2016, which is a continuation of U.S. application Ser. No. 14/612,316, filed Feb. 3, 2015, which claims priority to U.S. Provisional Patent Application Ser. No. 61/936,192, filed Feb. 5, 2014, each of which are incorporated herein by reference in their entirety.

FIELD

Embodiments generally pertain to optical devices and more specifically to modulators included in photonic integrated circuits.

BACKGROUND

Photonic Integrated Circuits (PICs) include interconnected semiconductor optical devices that are co-located on a single chip. Optical devices on a PIC have a variety of functionalities. For example, one optical device (e.g., a modulator) may modulate optical signals, while another optical device (e.g., a laser) may generate optical signals. Optical devices have thermal operating conditions dependent on their function, and thus react differently to changes in device operating temperature. For example, one optical device may need to dissipate heat, and another optical device may need to retain heat or dissipate less heat in order to operate as expected. Furthermore, due to the close proximity of optical devices on a PIC, the thermal performance of one device may impact the performance of other devices on the PIC.

BRIEF DESCRIPTION OF THE DRAWINGS

The following description includes discussions of figures having illustrations given by way of example of implementations and embodiments of the subject matter disclosed herein. The drawings should be understood by way of example, and not by way of limitation. As used herein, references to one or more "embodiments" are to be understood as describing a particular feature, structure, or characteristic included in at least one implementation of the disclosure. Thus, phrases such as "in one embodiment" or "in an alternate embodiment" appearing herein describe various embodiments and implementations of the disclosure, and do not necessarily all refer to the same embodiment. However, such phrases are also not necessarily mutually exclusive.

FIG. 5A-FIG. 5D illustrate various operating parameters for an optical modulator using one or more heating elements according to embodiments of the disclosure.

Descriptions of certain details and implementations follow, including a description of the figures, which may depict some or all of the embodiments described below, as well as a description of other potential embodiments or implementations of the concepts presented herein. An overview of embodiments is provided below, followed by a more detailed description with reference to the drawings.

DESCRIPTION

Embodiments of the disclosure describe opto-electronic modulators utilizing one or more heating elements. Throughout this specification, several terms of art are used. These terms are to take on their ordinary meaning in the art from which they come, unless specifically defined herein or unless the context of their use would clearly suggest otherwise. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects of the disclosure.

Figure 1A:
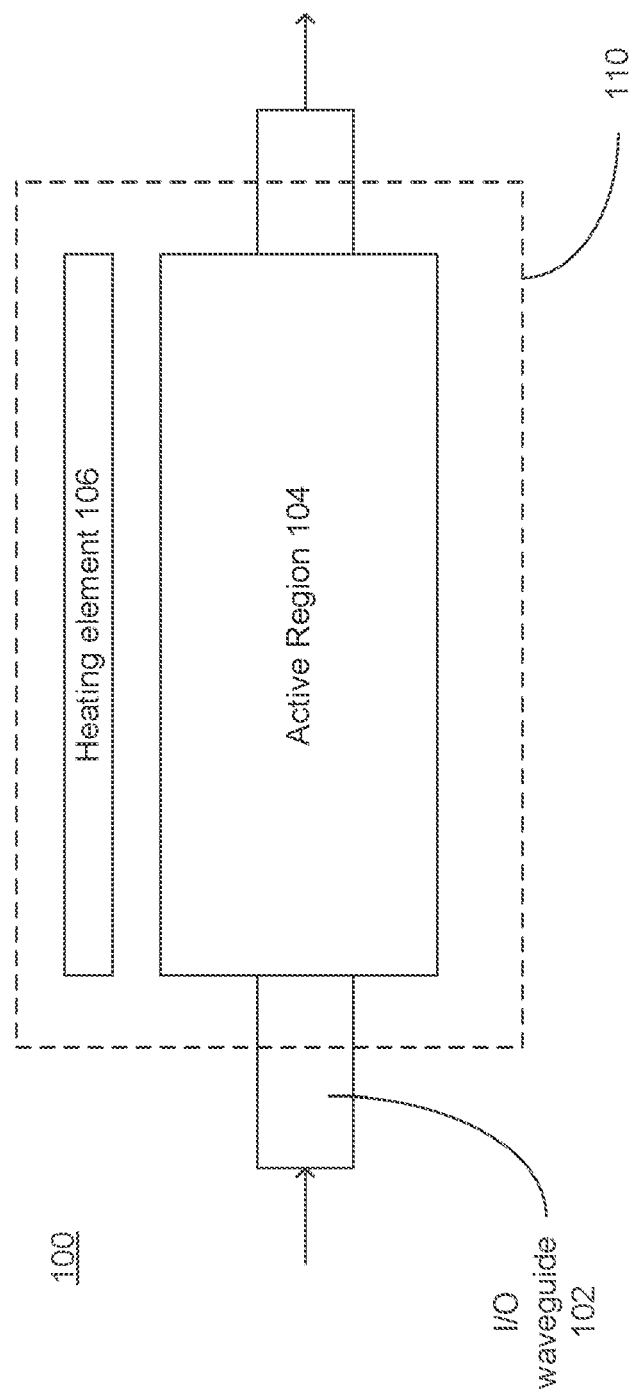
FIG. 1A is an illustration of an optical modulator utilizing a heating element according to an embodiment of the disclosure.

FIG. 1A is an illustration of an optical modulator utilizing a heating element according to an embodiment of the disclosure. In this embodiment, a modulator 100 is shown to include an input/output (I/O) waveguide 102 and an active region 104. The modulator 100 can be included in a photonic integrated circuit (PIC), and the I/O waveguide 102 can receive/output an optical signal from/to other components of the PIC, from/to an optical coupler coupled to the PIC, etc.

The I/O waveguide 102 and the active region 104 can comprise the same semiconductor material, or can comprise different semiconductor material (e.g., heterogeneous silicon/non-silicon material). For example, in some embodiments, the I/O waveguide 102 comprises a silicon waveguide that couples light to/from the active region 104, which can be disposed on the I/O waveguide 102 and can comprise non-silicon material (e.g., III-V semiconductor material).

An electric field can be applied to electrical contacts (not shown) of the modulator 100 to change the refractive index of the active region 104 in order to modulate a received optical signal. Changing the refractive index may include changing the absorption coefficient. In some embodiments, the modulator 100 can comprise an electro-absorption modulator (EAM) to change the power of the received optical signal, or an electro-optical modulator (EOM) to change the phase of the received optical signal.

In many applications for optical transmitters, EAMs may be used to modulate an optical signal in the on-off-keying (OOK) format. The systems in which these transmitters are implanted can operate over a wide temperature range. Prior art solutions hold the optical transmitter at a single temperature by means of a thermoelectric cooler (TEC); however, these prior art solutions utilize hermetic structures to seal the optical transmitter, which can further utilize expensive packaging materials and methods. Furthermore, TECs can consume large amounts of power.

To reduce the cost and power consumption of optical transmitters, packaging techniques and temperature ranges of operation are utilized so that the transmitter operates in conditions that match that of the electrical system surrounding the transmitter. In this scenario, the transmitter is termed "uncooled;" however, uncooled modulators are sensitive to temperature changes due to the inherent shift of the band-edge in semiconductor absorption above the band gap via electron-hole pair creation. In other words, as temperature increases in the active region 104, the band-edge can shift to longer wavelengths, resulting in higher absorption at a particular wavelength of operation. During operation, this is manifested as an increase in insertion loss and a change in extinction ratio (ER) of the modulator 100. During operation over a wide temperature range, this shift could induce an insertion loss and ER change that is unacceptable for the system. For an EOM, the most efficient phase shift can occur at a particular offset between the wavelength of the bandgap absorption edge and the wavelength of the modulated light. As temperature increases in the active region, in addition to increasing the insertion loss of modulator 100, the efficiency of phase shift in an EOM may be reduced.

Embodiments of the disclosure allow a modulator in an uncooled optical transmitter to meet the temperature range and wavelength range demands of a system while relaxing the bias voltage range and maximum bias voltage, and without consuming large amounts of power. In this embodiment, a heating element 106 is disposed along (in this illustration, alongside) the active region 104 to control an operating temperature of the modulator 100, and thus, to control an absorption (for EAMs) or phase shift (for EOMs) of the modulated optical signal. In this embodiment, a heating element 106 is shown to be disposed along the length/width (i.e., long dimension) of the active region 104 such that the region is heated uniformly (or substantially uniformly) along its length. As described in further detail below, the heating element 106 is utilized to account for some or all of the temperature range of operation, and in effect, reduce the local temperature range of the modulator 100. For example, the heating element 106 may be used to stabilize the gain or phase shift of the modulated optical signal (i.e., gain or phase shift generated by the active region 104) in response to a detected wavelength change in the modulated optical signal.

In this embodiment, the materials and the structure of the modulator 100 may be chosen such that the thermal conductivity for a region 110 surrounding the heating element 106 and the active region 104 is high, but is also thermally isolated from the ambient temperature surrounding the region 110 to increase the power efficiency of the heating element 106. The region 110 can be thermally isolated from the substrate of the PIC using any solution to vary its thermal conductivity (e.g., different materials, different structural features such as thermal shunts, etc.). In one embodiment, the region 110 can comprise low thermal conductivity between the heating element 106 and a heat sink for the PIC (e.g., a heat sink disposed on the substrate of the PIC), high thermal conductivity between the heating element 106 and the active region 104, and low thermal conductivity between the remaining portions of the modulator 100 and the PIC heat sink.

In embodiments wherein the I/O waveguide 102 and the active region 104 comprise different semiconductor material (e.g., heterogeneous silicon/non-silicon material), the I/O waveguide 102 may be doped to create a resistor in silicon to function as the heating element 106 (but, in contrast to the illustration of FIG. 1, disposed in the silicon semiconductor material—i.e., underneath the active region 104). For these embodiments, the thermal conductivity between the heater 106 and the active region 104 is very high due to their proximity to one another.

Figure 1B:
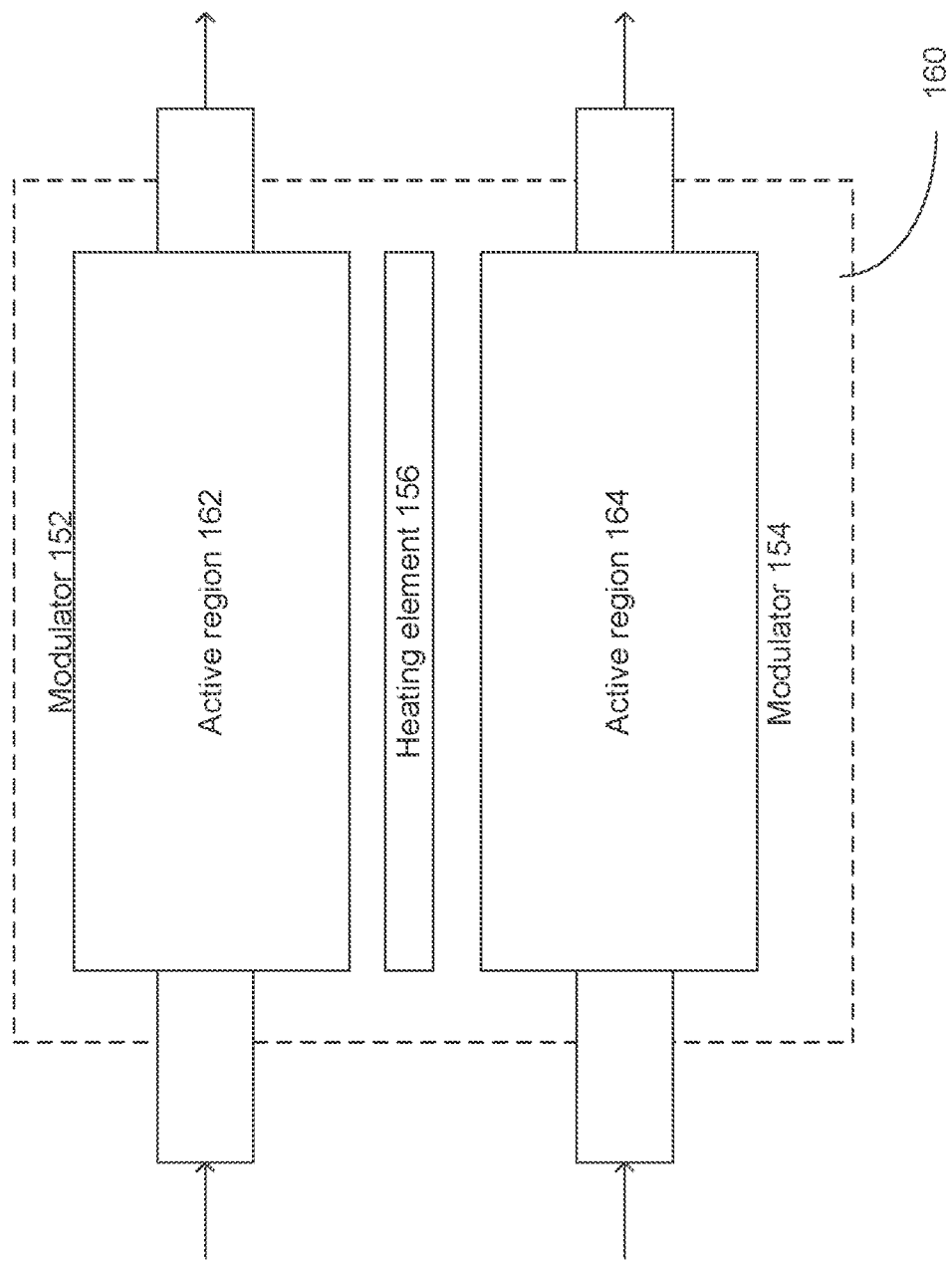
FIG. 1B illustrates a heating element utilized by a plurality of optical modulators according to an embodiment of the disclosure.

In some embodiments, a PIC may include a plurality of modulators; a heating element can be shared by multiple modulators to increase power efficiency and reduce the number of heating components in the PIC. FIG. 1B illustrates a heating element utilized by a plurality of modulators according to an embodiment of the disclosure. In this embodiment, the heating element 156 is disposed alongside the active region 162 of the modulator 152, and the active region 164 of the modulator 154. The heating element 156 may be used to affect or control the active regions 162 and 164 simultaneously due to the close proximity of the modulators 152 and 154 on the PIC. The heating element can affect or control both the active regions 162 and 164 in a similar manner, for example, to control the band-edge shifts of both active regions similarly, or due to the likelihood of ambient temperature changes affecting both modulators in a similar fashion. The region 160, shown to include the active regions 162 and 164 and the heating element 156, may be thermally isolated from a substrate of the PIC, a heat sink disposed on the PIC, and/or other components of the PIC as discussed above. This embodiment may be utilized for a Mach-Zehnder modulator (MZM) utilizing two phase modulators in a push-pull configuration. In these embodiments, two adjacent modulators could have the same operating wavelength. In some configurations they would have the same average power dissipation and bias voltage, such that it would be optimal to use the heater to have the same band-edge shift for both of modulators 152 and 154.

In addition to thermally isolating regions surrounding the heating elements, the thermal conductivity of a PIC may be designed such that the thermal conductivity between the modulators and a heat sink is highest where the incident light reaches the active regions of the modulators. This can reduce the amount of self-heating that occurs at the input of a modulator. A possible failure mechanism of a modulator is reaching a critical temperature, so this type of thermal engineering may increase the threshold at which this failure mechanism occurs. Furthermore, by designing thermal conductivity to vary along the length of an active region, it may be possible to achieve an optimal performance giving these competing requirements.

Figure 2:
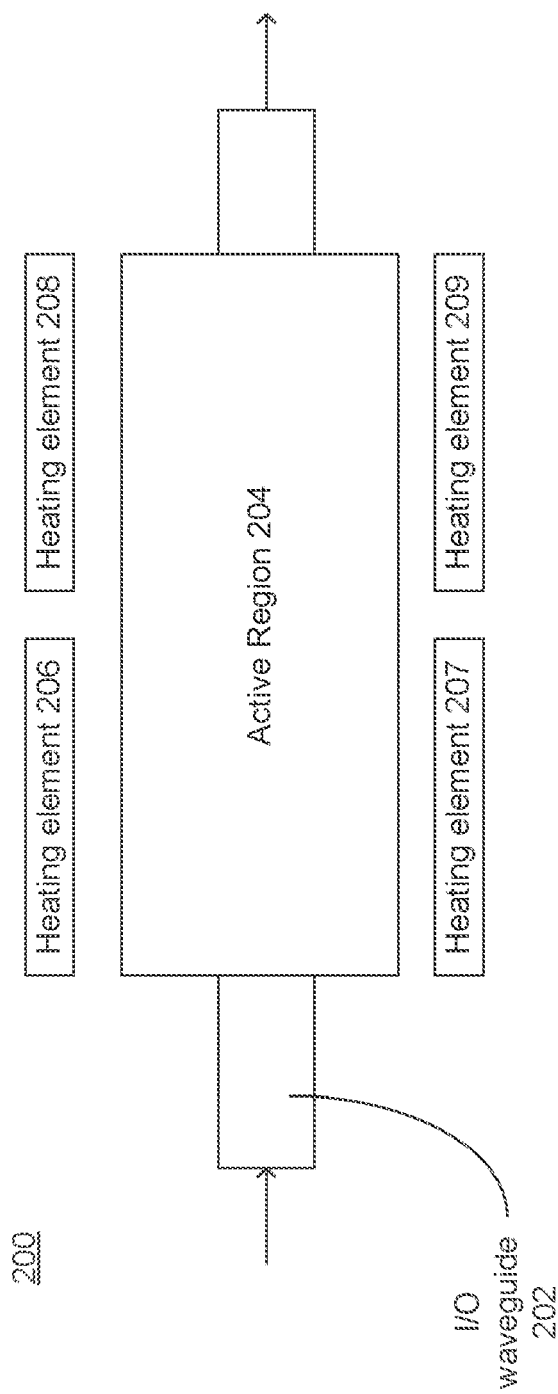
FIG. 2 is an illustration of an optical modulator utilizing a plurality of heating elements according to an embodiment of the disclosure.

Solutions to vary the temperature along the length of an active region can also include utilizing multiple heating elements. FIG. 2 is an illustration of an optical modulator utilizing a plurality of heating elements according to an embodiment of the disclosure. In this embodiment, a modulator 200 is shown to include an I/O waveguide 202 and an active region 204. In this embodiment, a plurality of heating elements 206-209 are shown to be disposed alongside the active region 204. The heating elements 206-209 may be controlled independently, in sub-sets, or collectively. During some operating conditions, the temperature along the active region 204 may vary and be non-uniform—e.g., non-uniform self-heating along the active region 204 may be due to a non-uniform light absorption profile. The heating elements 206-209 may heat the active region 204 non-uniformly to counterbalance the self-heating profile, and thus generating a uniform temperature along the active region 204. For example, the heating elements 206-209 may each have a varied resistance along the active region 204 to produce non-uniform heating (alternatively, a single heating element such as the heating elements 106 and 156 of FIG. 1A-FIG. 1B can have a varied resistance along the element). In other embodiments, the heating elements 206-209 can be controlled differently to generate a specific temperature profile. For example, the active region 204 may have its highest operating temperature where the incident light from the I/O waveguide 202 reaches the active region, and thus the heating elements 206 and 207 may be operated at a lower temperature compared to the heating elements 208 and 209.

Figure 3:
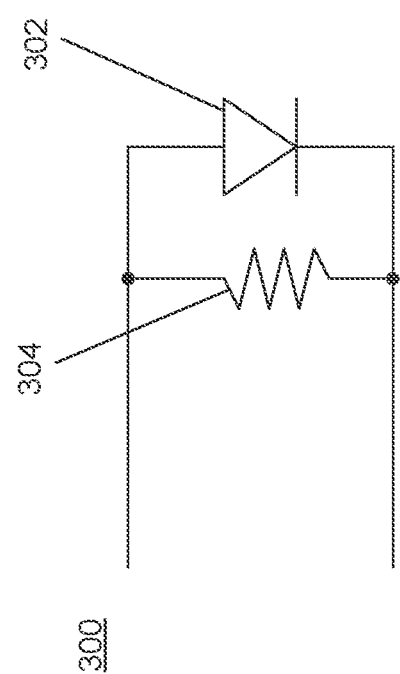
FIG. 3 is an illustration of an optical modulator utilizing a termination resistor as a heating element according to an embodiment of the disclosure.

FIG. 3 is an illustration of an optical modulator utilizing a termination resistor as a heating element according to an embodiment of the disclosure. In this embodiment, a PIC sub-circuit 300 is shown to include a modulator 302 (illustrated as a diode) coupled to a termination resistor 304 (i.e., coupled to the electrical contacts of the modulator 302). The termination resistor 304 may be included in the modulation signal circuitry to provide the correct impedance for the modulator driver (i.e., impedance matching to maximize the transfer of power from a driver circuit to the modulator 302). When the modulation signal and bias are supplied to the modulator 302 and the termination resistor 304, the resistor may dissipate power and create heat, thereby heating the active region of the modulator 302. Thus, in this embodiment, the termination resistor 304 functions as an impedance for the modulation signal circuitry and as a heating element for the modulator 302; hence no additional control circuitry or control signals are needed to heat the modulator 302. Since both heating the modulator and increasing the bias voltage both shift the band edge to a longer wavelength, a single control loop can adjust the bias voltage of the modulator and obtain an additive effect of shifting the band edge through these two means.

A very large bias voltage range allows for a modulator to operate over a wide temperature range, but also correspondingly increases the complexity of the surrounding electronics. By adjusting the local temperature of the modulator 300 in response to an increase in applied bias voltage, the bias voltage range can be relaxed, and in particular, the maximum bias voltage can be decreased.

Figure 4:
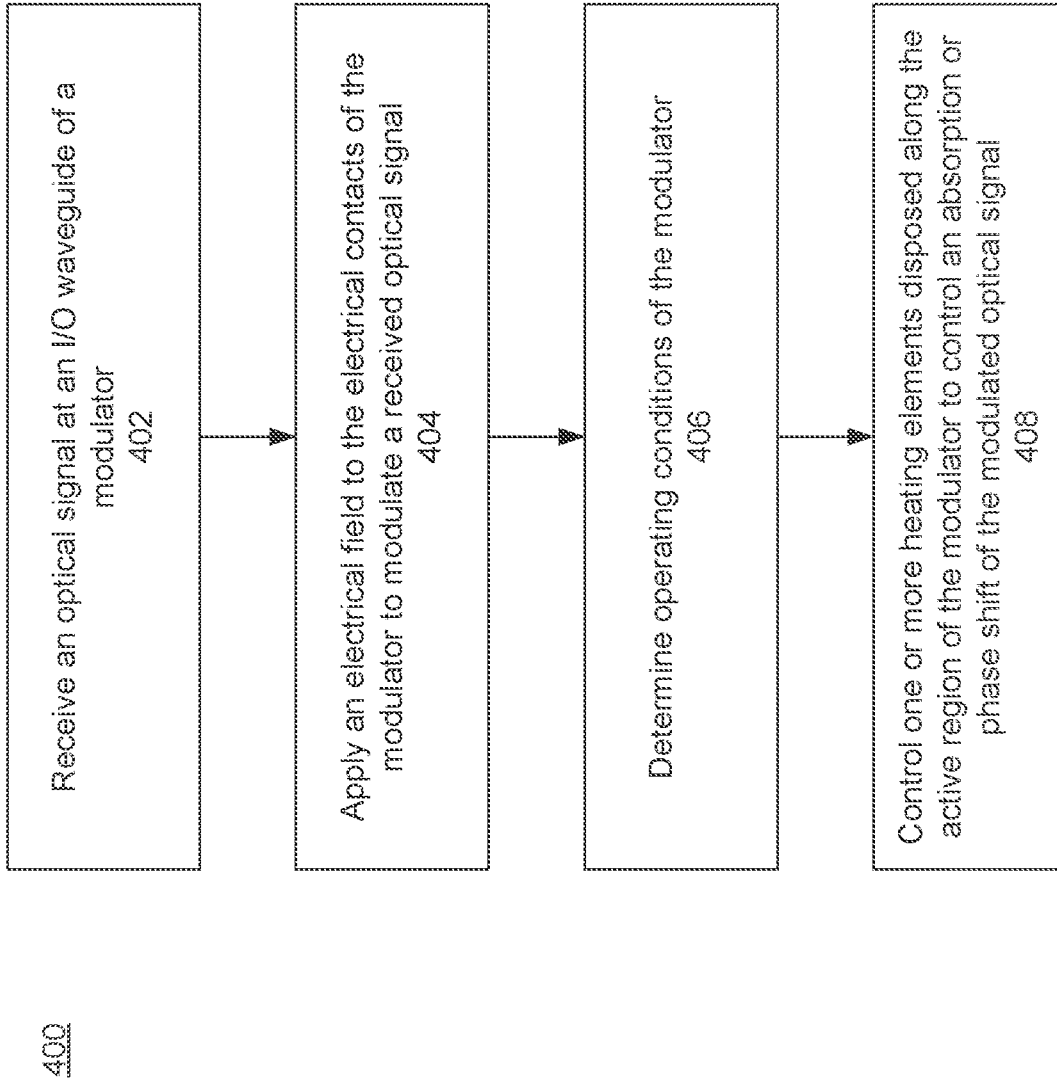
FIG. 4 is a flow diagram for controlling the operating temperature of an optical modulator using one or more heating elements according to an embodiment of the disclosure.

FIG. 4 is a flow diagram for controlling the operating temperature of an optical modulator using one or more heating elements according to an embodiment of the disclosure. Flow diagrams as illustrated herein provide examples of sequences of various process actions. Although the actions are shown in a particular sequence or order, unless otherwise specified, the order of the actions can be modified. Thus, the described and illustrated implementations should be understood only as examples. The illustrated actions can be performed in a different order, and some actions can be performed in parallel. Additionally, one or more actions can be omitted in various embodiments; thus, not all actions are required in every implementation. Other process flows are possible.

A process 400 is shown to include executing an operation for receiving an optical signal at an I/O waveguide of a modulator (block 402). An operation for applying an electric field to one or more electrical contacts disposed on an active region of the modulator to modulate the received optical signal is executed (block 404). The applied electric field modulates the received optical signal by changing a refractive index or absorption of the active region. As discussed above, in some embodiments, the I/O waveguide and the active region of the modulator can comprise the same semiconductor material, or can comprise different (i.e., heterogeneous) material.

An operation is executed to determine the operating conditions of the modulator (block 406). In some embodiments, a change in operating temperature may be detected, or a change from the current operating temperature may be desired; in other embodiments, a change in the current output wavelength of the modulated optical signal may be detected, or a change in the current gain or phase of the modulated optical signal may be desired. In response to determining the operating conditions of the modulator, an operation to control one or more heating elements disposed along the active region in order to control an absorption or phase shift of the modulated optical signal is executed (block 408). As discussed above, in some embodiments, a single heating element may be utilized, while in other embodiments, a plurality of heating elements may be utilized; furthermore, the heating element(s) may be controlled independently from the active region (e.g., as discussed above with reference to FIG. 2), or may be controlled utilizing the same electric field used to control the absorption or phase shift of the active region of the modulator (e.g., as discussed above with reference to FIG. 3).

FIG. 5A-FIG. 5D illustrate various operating parameters for an optical modulator using one or more heating elements according to embodiments of the disclosure. FIG. 5A illustrates an exemplary set of operating parameters including a graph 502 that illustrates changes to a heating element temperature in response to ambient temperature changes, a graph 504 that illustrates changes to a modulator bias voltage in response to ambient temperature changes, and a graph 506 that illustrates changes to a modulator operating temperature in response to ambient temperature changes 506.

As shown in this embodiment, one or more heating elements are controlled to heat a modulator to an initial temperature; in response to an increase in ambient temperature, the one or more heating elements are adjusted to produce lower heat (as shown in the graph 502) to hold the modulator at an (at least substantially) constant temperature (as shown in the graph 506).

Controlling the modulator according to these parameters allows for the output of the modulator to remain constant throughout any ambient temperature change, and thus, allows the bias voltage applied to the modulator to remain (at least substantially) constant (as shown in the graph 504). A possible failure mechanism of a modulator is reaching a critical temperature, so in this embodiment, once the ambient temperature exceeds a threshold, the modulator may be presumed to have a non-reliable output. In other words, in this embodiment the one or more heating elements are controlled to hold the temperature of the modulator at or near its maximum temperature of operation at all ambient temperatures. In this case, the bias voltage on the modulator, as shown in the graph 504, is held constant across all ambient temperatures, simplifying the electronics and reducing the maximum bias voltage required.

As discussed above, as temperature increases in the active region of the modulator, the band-edge shifts to longer wavelengths, resulting in higher absorption or phase shift at a particular wavelength of operation. During operation, this is manifested as an increase in insertion loss and a change in ER of the modulator. To prevent this insertion loss/change in the ER, the applied bias voltage to the modulator can be adjusted, or the temperature of the modulator can be adjusted, as shown in the exemplary set of operating parameters illustrated in FIG. 5B.

As shown in graph 516, one or more heating elements are controlled to heat a modulator to an initial temperature; in response to an increase in ambient temperature, the one or more heating elements are adjusted to produce lower heat (as shown in the graph 512) to hold the modulator to at an (at least substantially) constant temperature (as shown in the graph 516) when the ambient temperature changes within the range of temperature values "A" to "B." In other words, in this embodiment the one or more heating elements are utilized when the ambient temperature drops below a specific point in the operational temperature range (i.e., temperature value "B"). In effect, this reduces the total local temperature range of the modulator, relaxing the bias voltage requirements and reducing the maximum bias voltage required.

In this embodiment, the one or more heating elements are used over a subset of the operational temperature range of the modulator (i.e., from the range of temperature values "A" to "B"); within this temperature range, the bias voltage applied to the modulator is constant (as shown in graph 514). The one or more heating elements are disabled when the ambient temperature reaches a threshold value (i.e., temperature value "B") that is less than the modulator's critical temperature. As shown in the graphs 514 and 516, when the modulator temperature increases past the temperature value "B," the bias voltage decreases corresponding to the increase of the ambient temperature around the modulator to offset any absorption or phase shift changes in the output signal.

FIG. 5C illustrates another exemplary set of operating parameters according to an embodiment of the disclosure. As shown in graphs 522 and 526, one or more heating elements are used to increase or decrease the ambient temperature of the modulator in order to account for changes in wavelength in the input optical signal (and thus, the x-axis for these graphs and graph 524 is the "wavelength" of the modulated optical signal). Thus, in this embodiment, as opposed to holding a modulator to a near-constant temperature, one or more heating elements are used to hold the absorption or phase shift of the modulator constant as input wavelength is varied (the bias voltage applied to the modulator is held constant, as shown in graph 524).

Active regions comprising III-V material may be sensitive to operational wavelength. For a given III-V material, and at a single temperature, operation at different wavelengths may produce a different insertion loss and ER. To combat insertion loss/ER, different bias voltages can be applied to a modulator to tailor its insertion loss and ER to its particular wavelength; however, in this embodiment, by shifting the band-edge via a local temperature change, a modulator can operate with the same applied bias voltage (as shown in the graph 524) or a reduced bias range, simplifying the electrical system and relaxing the adjustable bias voltage amount. Another technical effect is that a single material specification may be used over a wider wavelength range by operating devices at different temperatures, potentially reducing the cost or complexity of a wavelength-reconfigurable PIC (or a PIC used in wavelength division multiplexing (WDM) applications).

FIG. 5D illustrates another exemplary set of operating parameters according to an embodiment of the disclosure. These operating parameters correspond to embodiments wherein one or more heating elements comprise a termination resistor electrically coupled to the electrical contacts of a modulator (e.g., as shown in FIG. 3). In these embodiments, as the termination resistor also functions as the heating element of the modulator, it is not separately controlled from the bias voltage; however, the termination resistor/heating element reduces the modulator temperature range to be less than the ambient temperature range. As shown in the graph 536, in effect, these embodiments reduce the total local temperature range of the modulator (as the modulator is already heated to a certain temperature during initial operation due to the application of the bias voltage), and also relax the bias voltage requirements (as shown in the graph 534).

Figure 6:
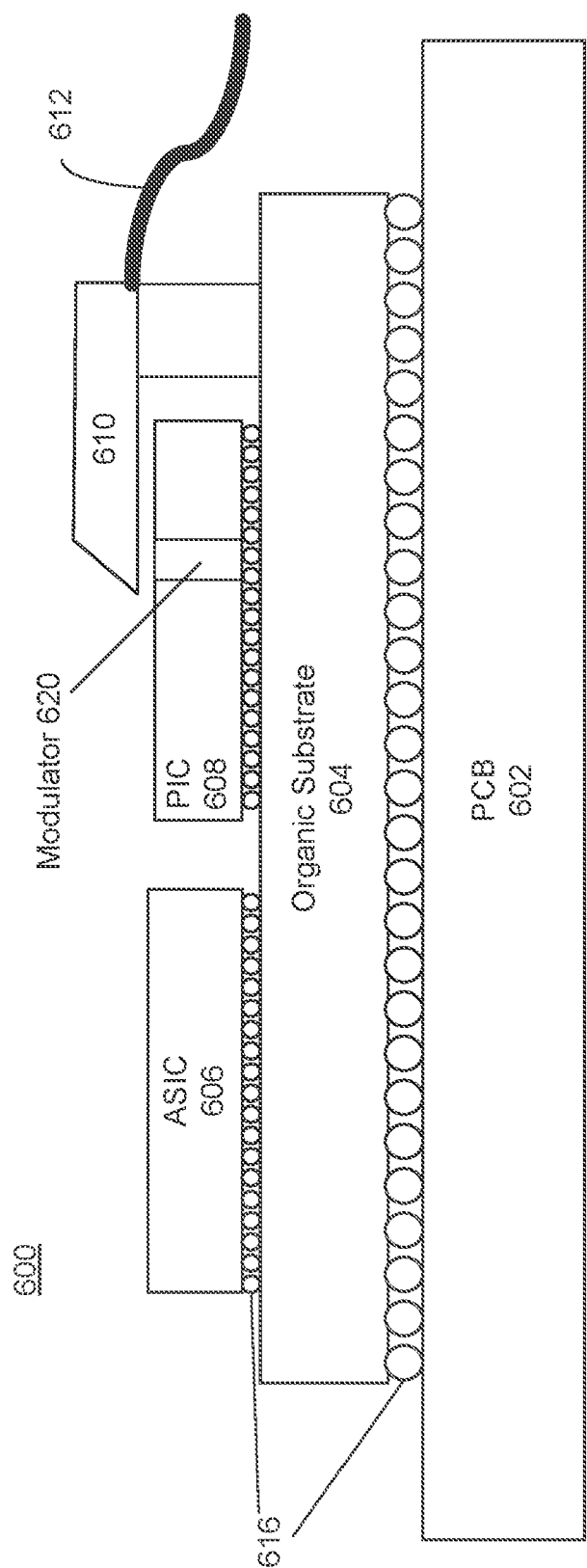
FIG. 6 is an illustration of components of a device or system including a photonic integrated circuit that further includes at least one optical modulator according to an embodiment of the disclosure.

FIG. 6 is an illustration of components of a device or system including a PIC that further includes at least one optical modulator according to an embodiment of the disclosure. In this embodiment, a device or system 600 is shown to include a printed circuit board (PCB) substrate 602, an organic substrate 604, an application specific integrated circuit (ASIC) 606, and a PIC 608, which exchanges light with an optical fiber 612 via a connector 610. The optical devices of the PIC 608 are controlled, at least in part, by control circuitry included in the ASIC 606.

Both the ASIC 606 and the PIC 608 are communicatively coupled via the organic substrate 604. The PCB 608 is coupled to the organic substrate 604 via a ball grid array (BGA) interconnect 616, and may be used to interconnect the organic substrate (and thus, the ASIC 606 and the PIC 608) to other components of the device or system 600 not shown—e.g., interconnection modules, power supplies, etc.

The PIC 608 may be formed of any semiconductor material suitable for photonic devices and photonic operation, such as silicon based materials (e.g., silicon (Si), silicon nitride (SiN)), non-silicon material such as III-V material, magneto-optic material, or crystal substrate material, or a combination of silicon and non-silicon material (alternatively referred to as "heterogeneous material"). The PIC 608 may include one or more optical devices controlled, at least in part, by control circuitry included in the ASIC 606, and may be formed of any semiconductor material suitable for electronic devices and electronic operation, such as Si.

The PIC 608 is shown to include a modulator 620, labeled for exemplary purposes only (the PIC 608 may include more than one modulator). The modulator 620 may be used to modulate optical signals generated by one or more transmission components of the PIC, optical signals received from the fiber 612, etc. The modulator 620 may comprise an EAM or an EOM, and may have an active region comprising any material suitable for modulation. In some embodiments, the material of the active region of the modulator 620 is chosen such that the absorption coefficient of said region is easily affected by either the Franz-Keldysh effect if said region comprises bulk material (e.g., intrinsic Indium Gallium Arsenide Phosphide (i-InGaAsP) or Indium Aluminum Gallium Arsenide (InAlGaAs)) or the quantum confined stark effect (QCSE) if said region comprises multiple quantum wells (MQW).

As discussed above, the modulator 620 can utilize one or more heating elements to control an absorption or phase shift of the modulated optical signal. As discussed above, at least the active region and the one or more heating elements of the modulator 620 are included in a thermal isolation region comprising a low thermal conductivity material that is less thermally conductive than a substrate of the PIC 608 to thermally isolate the active region and the one or more heating elements of the modulator 620 from a heat sink disposed on the PIC (not shown) and/or other components of the PIC 608.

Reference throughout the foregoing specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout the specification are not necessarily all referring to the same embodiment. Furthermore, the particular features, structures, or characteristics can be combined in any suitable manner in one or more embodiments. In addition, it is to be appreciated that the figures provided are for explanation purposes to persons ordinarily skilled in the art and that the drawings are not necessarily drawn to scale. It is to be understood that the various regions, layers, and structures represented in the figures can vary in size and dimensions.

The above described embodiments can comprise silicon on insulator (SOI) or silicon-based (e.g., silicon nitride (SiN)) devices, or can comprise devices formed from both silicon and a non-silicon material. Said non-silicon material (alternatively referred to as "heterogeneous material") can comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V-based materials can be significantly higher than in silicon-based materials, as electron speed in III-V semiconductors is much faster than that in silicon semiconductors. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in heterogeneous optical devices; in some embodiments, said heterogeneous devices utilize low-loss heterogeneous optical waveguide transitions between the devices' heterogeneous and silicon-only waveguides.

Magneto-optic materials allow heterogeneous PICs to operate based on the magneto-optic (MO) effect. Such devices can utilize the Faraday effect, in which the magnetic field associated with an electrical signal modulates an optical beam, offering high bandwidth modulation, and rotates the electric field of the optical mode, enabling optical isolators. Said magneto-optic materials can comprise, for example, materials such as iron, cobalt, or yttrium iron garnet (YIG).

Crystal substrate materials provide heterogeneous PICs with a high electro-mechanical coupling, linear electro optic coefficient, low transmission loss, and stable physical and chemical properties. Said crystal substrate materials can comprise, for example, lithium niobate (LiNbO$_3$) or lithium tantalate (LiTaO$_3$).

In the foregoing detailed description, the method and apparatus of the present subject matter have been described with reference to specific exemplary embodiments thereof. It will, however, be evident that various modifications and changes can be made thereto without departing from the broader spirit and scope of the present disclosed subject matter. The present specification and figures are accordingly to be regarded as illustrative rather than restrictive.

Embodiments of the disclosure describe a modulator included in a PIC comprising an I/O waveguide to receive an optical signal and output a modulated optical signal, an active region disposed on the waveguide to modulate the received optical signal, one or more electrical contacts to receive an electric field to change an absorption or phase shift of the active region, and one or more heating elements disposed along the active region to control the absorption or phase shift of the modulated optical signal, wherein at least the active region and the one or more heating elements are included in a thermal isolation region comprising a low thermal conductivity to thermally isolate the active region and the one or more heating elements from a substrate of the PIC.

In some embodiments, the PIC is disposed on a heat sink material, and thermal isolation region is to thermally isolate the active region and the one or more heating elements from the heat sink material. In some embodiments, the one or more heating elements are to stabilize the absorption or phase shift of the modulated optical signal in response to a detected wavelength change in the received optical signal.

In some embodiments, the modulator comprises at least one of an electro-absorption modulator (EAM), and wherein the one or more heating elements disposed along the active region are to control the absorption of the modulated optical signal, or an electro-optic modulator (EOM), and wherein the one or more heating elements disposed along the active region are to control the phase shift of the modulated optical signal.

In some embodiments, the at least one heating element comprises a plurality of heating elements. In some embodiments, the plurality of heating elements are disposed on a same side of the active region. In some embodiments, the plurality of heating elements are disposed on opposing sides of the active region. In some embodiments, each of the plurality of heating elements are independently controlled.

In some embodiments, the one or more heating elements comprises a termination resistor coupled to the one or more electrical contacts. In some embodiments, the one or more heating elements are further disposed along a second active region of a second modulator of the PIC, and is to control an absorption or phase shift of a second modulated optical signal of the second modulator. In some embodiments, the modulator and the second modulator are included in a push-pull driven MZM.

Embodiments of the disclosure describe a method comprising receiving an optical signal at a waveguide of a modulator included in a PIC, applying an electric field to one or more electrical contacts disposed on an active region of the modulator to modulate the received optical signal by changing an absorption or phase shift of the active region, and controlling one or more heating elements disposed along the active region to control an absorption or phase shift of the modulated optical signal, wherein at least the active region and the one or more heating elements are included in a thermal isolation region comprising a low thermal conductivity material to thermally isolate the active region and the one or more heating elements from a substrate of the PIC.

In some embodiments, controlling the one or more heating elements disposed along the active region to control the absorption or phase shift of the modulated optical signal comprises adjusting the one or more heating elements to hold a temperature of the active region substantially constant in response to a change in an ambient temperature surrounding the PIC. In some embodiments, the one or more heating elements are disabled in response to ambient temperature surrounding the PIC exceeding a threshold value.

In some embodiments, controlling the one or more heating elements disposed along the active region to control the output wavelength of the modulated optical signal comprises changing a temperature of the active region to account for changes in wavelength of the received optical signal.

In some embodiments, the one or more heating elements comprises a plurality of heating elements. In some embodiments, controlling the one or more heating elements disposed along the active region to control the absorption or phase shift of the modulated optical signal comprises controlling each of the plurality of heating elements independently. In some embodiments, controlling the one or more heating elements disposed along the active region to control the absorption or phase shift of the modulated optical signal comprises controlling each of the plurality of heating elements via a single control signal.

In some embodiments, the one or more heating elements comprises a termination resistor coupled to the one or more electrical contacts disposed on the active region of the modulator such that applying the electric field to one or more electrical contacts further controls the one or more heating elements.

In some embodiments, the one or more heating elements are further disposed along a second active region of a second modulator of the PIC, and the method further comprises controlling the one or more heating elements to control an absorption or phase shift of a second modulated optical signal of the second modulator.

The invention claimed is:

1. A modulator circuit comprising:
a waveguide to guide light;
an active region, the waveguide extending along the active region;
one or more heaters to apply a level of heat to the active region;
one or more electrodes to generate an electric field in the active region, the electric field comprising a time-varying voltage that is superimposed on a bias voltage; and
control circuitry to change, in response to an ambient temperature change, the level of heat applied to the active region to offset changing the electric field to compensate for the ambient temperature change.

2. The modulator circuit of claim 1, wherein the control circuitry reduces the level of heat applied to the active region.

3. The modulator circuit of claim 2, wherein an initial level of heat is applied to the active region before the ambient temperature change, and wherein the level of heat is reduced from the initial level of heat.

4. The modulator circuit of claim 1, wherein the control circuitry increases the level of heat applied to the active region.

5. The modulator circuit of claim 1, wherein the bias voltage adjusts an absorption of the light by a modulator in the modulator circuit.

6. The modulator circuit of claim 1, wherein the electric field comprises a time varying electric field.

7. The modulator circuit of claim 1, wherein the control circuitry is further configured to:
in response to a further ambient temperature change, lower the electric field.

8. The modulator circuit of claim 1, wherein the electric field is lowered while the level of heat from the one or more heaters is maintained.

9. The modulator circuit of claim 1, wherein adding heat to the active region causes a variation in a refractive index of the active region.

10. The modulator circuit of claim 9, wherein adding heat to the active region causes the variation in the refractive index of the active region and a corresponding variation in an optical path traversed by the light in the waveguide.

11. The modulator circuit of claim 1, wherein the one or more electrodes comprises a plurality of electrodes that are positioned proximate to the active region.

12. The modulator circuit of claim 11, wherein the electric field causes a variation in a refractive index of the active region.

13. The modulator circuit of claim 12, wherein the variation in the refractive index causes a corresponding further variation in an optical path traverses by light in the waveguide.

14. The modulator circuit of claim 1, further comprising:
an additional active region, wherein the one or more heaters further apply the level of heat to the additional active region.

15. The modulator circuit of claim 1, wherein the one or more heaters comprises a plurality of heating elements that apply heat to the active region.

16. A method for modulator circuit heating comprising:
guiding light in a waveguide of the modulator circuit;
applying a level of heat to an active region, the waveguide extending along the active region;
generating, using one or more electrodes, an electric field in the active region, the electric field comprising a time-varying voltage that is superimposed on a bias voltage; and
in response to an ambient temperature change, changing, by control circuitry, the level of heat applied to the active region to offset changing the electric field to compensate for the ambient temperature change.

17. The method of claim 16, wherein the level of heat applied to the active region is reduced in response to the ambient temperature change.

18. The method of claim 17, wherein an initial level of heat is applied to the active region before the ambient temperature change, and wherein the level of heat is reduced from the initial level of heat.

19. The method of claim 16, wherein adding heat to the active region causes a variation in a refractive index of the active region.

20. The method of claim 19, wherein adding heat to the active region causes the variation in the refractive index of the active region and a corresponding variation in an optical path traversed by the light in the waveguide.

* * * * *